Oct. 27, 1936.  C. B. DE VLIEG  2,059,091
BACKLASH COMPENSATOR FOR MACHINE TOOLS
Filed May 2, 1934  2 Sheets-Sheet 1
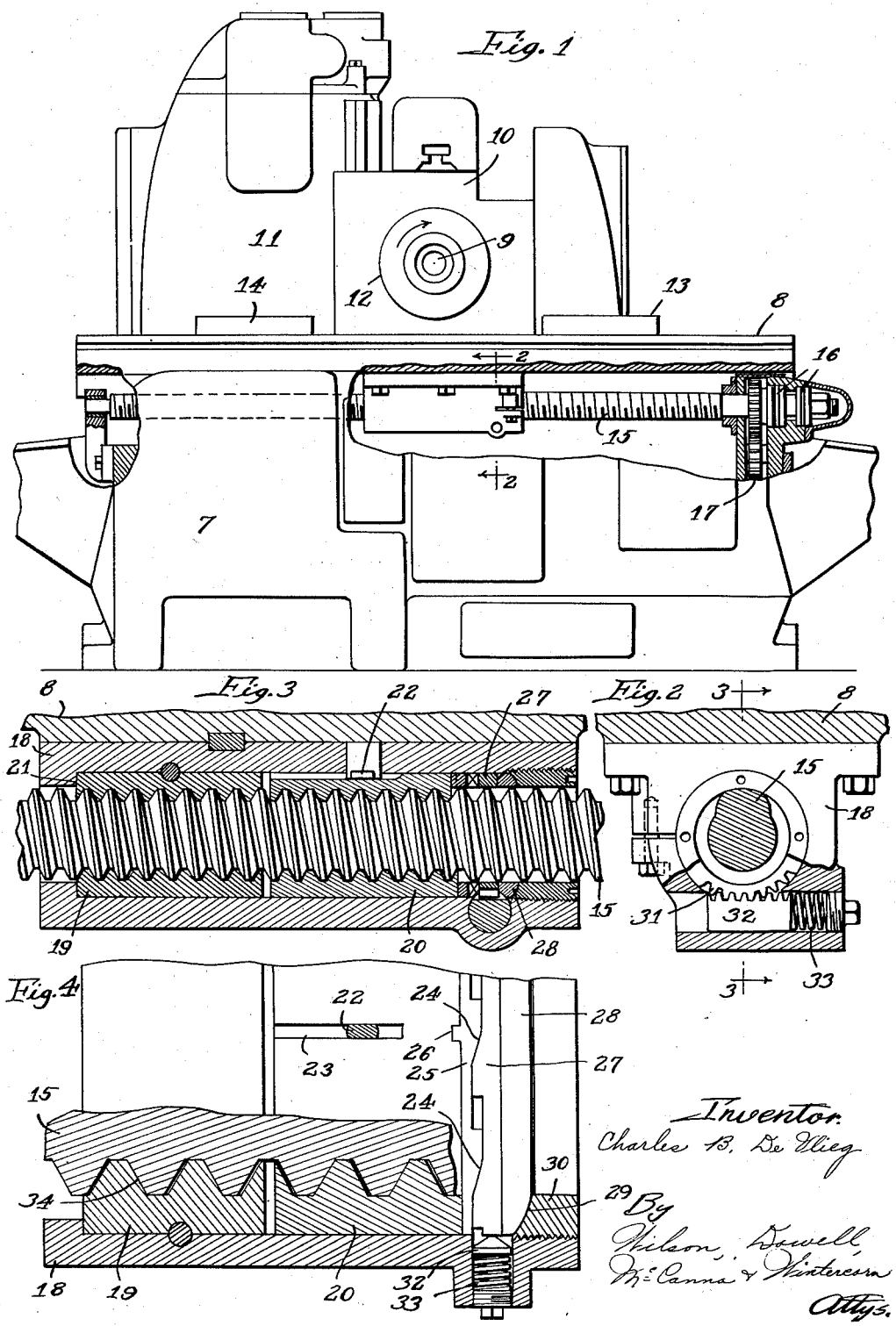

Oct. 27, 1936.  C. B. DE VLIEG  2,059,091
BACKLASH COMPENSATOR FOR MACHINE TOOLS
Filed May 2, 1934  2 Sheets-Sheet 2
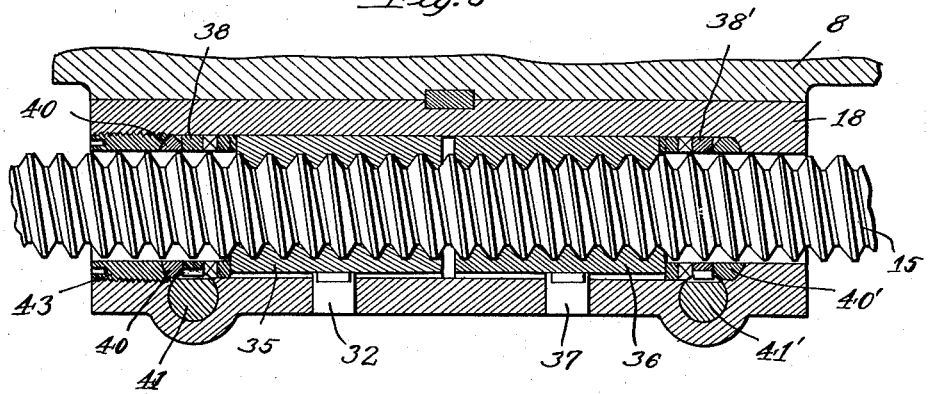
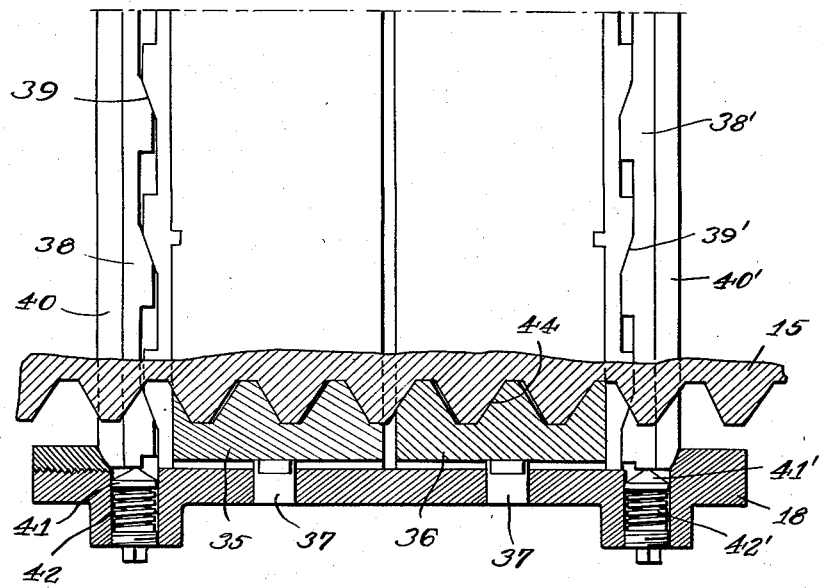
Inventor:
Charles B. De Vlieg
By
Wilson, Dowell, McKenna & Wintersen
Attys.

Patented Oct. 27, 1936

2,059,091

UNITED STATES PATENT OFFICE 2,059,091

BACKLASH COMPENSATOR FOR MACHINE TOOLS

Charles B. De Vlieg, Jackson, Mich., assignor to Associated Patents, Inc., Cincinnati, Ohio, a corporation of Ohio Application May 2, 1934, Serial No. 723,565

9 Claims. (Cl. 90—22)

This invention is an improvement on the invention disclosed in my application for Back lash remover, Serial No. 640,561, filed October 31, 1932, and is applicable to a screw and nut feed for the purpose of automatically eliminating back lash between the screw and nut members for the purpose of securing greater accuracy and precision in the operation. It is particularly adapted for application to work and tool supports in machine tools of various kinds. My invention is also for the purpose of enabling what is known in milling machine practice as climb cutting or hook-in cutting when applied to the screw and nut feed members for reciprocating the work support or table of a milling machine. It is particularly advantageous in its application to milling machines because it provides permanent absence of back lash which not only makes for improved milling operation under normal cutting but also enlarges the use of the machine to take care of hook-in cuts which otherwise could not be satisfactorily performed on ordinary milling machines. My invention, however, is not confined to milling machines or machine tools but may be used advantageously in other machines employing screw and nut members, particularly where heavy forces are employed and accuracy, as well as smoothness in operation, are desired.

The present invention embodies the principle of operation of my prior invention and embodies certain improvements promoting economy of space and manufacture of the parts.

Another object is to provide an improved cam construction with provision for equalizing the action of the several cam elements.

Another object is to provide a back lash compensator of the character described including provision for making certain adjustments when setting up the mechanism for operation, and subsequently.

A further object is to provide an improved construction designed for two-way operation under conditions such as are sometimes desired in milling machine practice, whereby to enable climb cutting in both directions of travel of the work support.

With these and other objects in view, as may hereinafter appear, one feature of the present invention consists in the provision of a novel and improved take-up device for maintaining a tight operating engagement between the screw and nut elements above-mentioned, to insure an accurate and even movement of the work table or support regardless of the force exerted on the table in either direction by the operation of the cutter. This device comprises a plurality of nuts threaded to the feed screw and supported in fixed angular relationship, and a take-up member yieldingly actuated and having a cam action of relatively large advantage for effecting a relative axial movement between the nuts to maintain a tight operating engagement between the feed screw and the nut elements. With this construction and arrangement of the parts, a substantially irreversible cam action is provided so that the strain exerted on the table in either direction by the engagement of the rotating cutter with the work is taken up against a rigid assembly of the two nut elements which is positively supported against endwise movement in either direction on the movable support or on the machine frame as the case may be, depending on whether the feed screw element is journaled on the table or on the machine frame.

The several features of the invention consist also in the devices, combinations and arrangement of parts hereinafter described and claimed, which, together with the advantages to be attained thereby will be readily understood by one skilled in the art from the following description taken in connection with the accompanying drawings, in which—

Figure 1 is a front elevation of a bed type milling machine embodying one form of my invention, showing parts of the frame in section;

Fig. 2 is an enlarged section through the take-up device, substantially on the line 2—2 of Fig. 1;

Fig. 3 is a vertical, longitudinal section through the screw and nut take-up device, substantially on the section line 3—3 of Fig. 2;

Fig. 4 is a diagram development illustrating the action of forces of the take-up device;

Fig. 5 is a vertical, longitudinal section similar to Fig. 3 but showing another form of my invention; and Fig. 6 is a diagram development of the form of the invention shown in Fig. 5.

For purpose of illustration I have shown my invention as applied to a general purpose bed-type milling machine having a suitable bed or frame designated generally by 7, a work-supporting table 8, mounted on suitable ways on the bed for reciprocation thereon, and a horizontal cutter spindle 9 suitably mounted in operating relation to the table. In this instance the spindle is journaled in a head 10 which is mounted for vertical adjustment on an upright column 11. Suitable mechanism (not shown) is provided for driving the spindle in either direction. It is well known in this art to provide suitable cutters for the various jobs and to properly support the spindle. A cutter is here designated diagrammatically by 12 and according to the form of my invention first to be described this cutter may be driven in a clockwise direction viewing Fig. 1 for milling a work-piece 14 when the table is fed to the left, this being a normal milling operation, and for milling a work-piece 13 when the table is fed to the right, this being for a hook-in milling operation. A suitable cutter may be driven in the opposite direction for normal and hook-in milling of the work-pieces 13 and 14 respectively, by reason of the application of my improvements hereinafter described. The table is reciprocated by means of screw and nut feed elements which may be arranged in any of various ways. For example, a feed screw 15 may be journaled on the bed or frame structure with suitable end thrust bearings 16 to prevent endwise displacement of the screw with respect to the bed structure, and the table may be equipped with a nut element threaded on the screw, so that upon rotation of the screw by suitable means the table will be fed lengthwise on the bed. The feed screw may be rotated manually or by power, it being well known in this art to provide feed mechanism for propelling the table at feed or rapid traverse speeds automatically or otherwise for various cycles of operation. In this instance the screw is rotated by gears 17 from a source of power not shown. As is well known in this art the feed screw may be journaled on the table against endwise displacement with respect thereto and one or more suitable nut elements threaded on the screw may be rotated manually or by power means for traversing the table.

In the form of my invention shown in Figs. 2, 3 and 4 a nut housing 18 rigidly secured to the underside of the table carries a fixed nut element 19 and a supplemental nut element 20. The nut 19 is fixed in the housing 18 by suitable means and abuts against the end shoulder 21 for the purpose of taking the load thrust in one direction. The nut 20 is free to move lengthwise of the screw but is held against rotative movement by means of a suitable key 22 engaged in a key-way 23 in the nut. This supplemental nut element is equipped at one end with a plurality of equally spaced cam elements 24, these being preferably formed on a cam ring 25 keyed to the nut at 26. A sleeve member 27 rotatable about the screw is provided with cam surfaces complemental to the cam surfaces 24 and is adapted to be moved rotatively by suitable means for exerting pressure against the movable nut element 20 for moving it axially in a take-up action. The sleeve member 27 bears at its opposite side against a thrust ring 28 which in turn has a spherical face 29 bearing against a complemental face on an end thrust collar 30 threadedly engaged in the nut housing 18. The sleeve 27 is equipped on its periphery with suitable gear teeth 31 in mesh with a rack member 32 which is urged in one direction by means of a compression spring 33 to turn the sleeve member 27 in a clockwise direction viewing Fig. 2. The compression spring acts against the cam sleeve 27 to impart a lengthwise tensioning strain to the screw and nut elements to maintain the nut elements against opposite sides of the screw threads as shown diagrammatically in Fig. 4. The angle of the cam surfaces 24 is such as to permit the employment of a relatively light strain to secure a relatively heavy tensioning strain against the screw and nut elements, and is further arranged to provide an extremely high resistance to any easing off action of the nut 20 against the combined force of the spring and the frictional resistance of the cam surface. With this construction it will be seen that while a yielding spring pressure is utilized to take up the play between the screw and nut elements, the arrangement of the cam surfaces 24 provides a substantially irreversible cam action, so that the entire strain upon the connections, due to the operation of the cutter against the work, is taken up against the end thrust bearings 30 and 21 to maintain a positive control of the position of the table under all conditions during feed movements of the table in either direction. The function of the cams 24 as a part of the take-up device is similar to the cam action in my prior application above-identified. This construction gives a tight operating engagement between the screw and the nut elements and prevents any possible back lash or chatter in the table drive under all operating conditions and enables climb cutting or hook-in cutting by reason of the fact that the take-up device maintains the supplemental nut 20 against one side of the screw thread in such manner as to prevent intermittent advancement of the screw under the corresponding variation in cutter thrust incidental to hook-in cutting. One of the advantages of this construction is that the thrust collar 30 may be adjusted to draw the cam up to a point to effect a close operating engagement between the nut elements and the screw. This adjustment is made to secure a close fit for the largest portion of the screw thread, the other variations in the screw being taken care of by the spring and cam action. The action of the cams is uniform because of the equalizing action of the thrust collar 28 by reason of its spherical seat 29. The parts 27 and 28 above referred to as a sleeve member and a thrust ring, respectively, may obviously be made as a single member, the two-part construction being shown as a preferred embodiment merely for convenience in manufacture; consequently, in certain of the claims the term "nut actuator means" is used as defining both members 27 and 28 and certain functions therein recited. The cam surfaces 24 are, in effect, helical means for transmitting axial movement to the nut element 20 as a result of rotative movement of the sleeve member 27. The term "helical means" is, therefore, used in the claims to define any equivalent means for performing the function of said cam surfaces.

In the form of my invention described above the load thrust or cutter thrust is always against the side 34 of the thread, but where a cutter is used for rotating in the opposite direction this thrust will be against the opposite side of the thread. These conditions would arise where it is desired to rotate the cutter spindle in opposite directions, using appropriate milling cutters, to perform normal and hook-in cuts in either direction. In Figs. 5 and 6 I have shown another form of my invention especially adapted for these conditions. In this form two nut elements 35 and 36 mounted in the housing 18 are maintained in constant angular relationship and against rotation by keys 37, this relationship being similar to that maintained between the nut elements 19 and 20 above-described, except that both of the nut elements 35 and 36 are free to move lengthwise of the screw. To each nut element is applied a take-up device similar to that above-described. The parts of this device for the nut element 35 consist of a sleeve member having cam surfaces 39 complemental to cam surfaces on the adjoining end of the nut member, a thrust collar 40, a rack member 41, and a compression spring 42. Similar parts for the nut member 36 are designated by reference numerals 38', 39', 40', 41' and 42'. Each of the thrust collars 40 and 40' has a spherical end thrust face bearing against a complemental face fixed with respect to the housing 18. Either or both of the latter faces may be adjustable but I have here shown an adjusting sleeve 43 for only the thrust collar 40. With this construction when the cutter spindle is driven in the opposite direction, that is, in a counter-clockwise direction, viewing Fig. 1, the load thrust resulting from a normal milling operation on the workpiece 13 is against the side 44 of the thread, the thrust being against the same side of the thread for hook-in cutting. Under this condition the nut element 35 is maintained against the opposite side of the screw thread and the take-up device functions for advancement or retraction of the nut element in accordance with variations in the screw thread.

I claim:

1. A back lash compensator of the character described comprising in combination, a movable support, driving means for said support comprising a feed screw, a pair of nut elements threaded thereto, means for imparting relative rotational movements to the screw and nut elements to drive the work support, means for maintaining a constant angular relationship between said nut elements, and a take-up device for controlling the relative axial positions of the nut elements to maintain a tight working engagement between the nut elements and the screw comprising a spring, a member yieldingly actuated by the spring and having an irreversible cam action to impart a relative axial movement to said nut elements, said cam action being effected by a plurality of cam surfaces, and means for equalizing the action of said cams circumferentially of the screw.

2. In a back-lash compensator of the character described, the combination of a movable support, driving means for said support comprising a feed screw, a pair of nuts threaded thereto, means for imparting relative rotational movement to the screw and nuts to drive the work support, means for maintaining a constant angular relationship between said nuts, and a take-up device for controlling the relative axial positions of the nuts to maintain a working engagement between the nuts and screw free from back-lash comprising nut actuator means rotative about the screw having circumferentially spaced cam surfaces at one end engageable with complementary cam surfaces fixed with respect to one of the nut elements, said nut actuator means having at its opposite end a spherical face having thrust bearing against the complementary face of a part stationary with respect to the support, and means exerting a force against said nut actuator means tending to move it rotatively to impart relative axial movement to said nut elements through the action of said cam surfaces.

3. A back lash compensator of the character described comprising, in combination, a movable support, driving means for said support comprising a feed screw, a pair of nuts threaded thereto, means for imparting relative rotational movements to the screw and nut elements to drive the work support, means for maintaining constant angular relationship between said nut elements, and a take-up device for controlling the relative axial positions of the nut elements to maintain a tight working engagement between the nut elements and the screw including a thrust collar about the screw spaced from the end of one of said nut elements, said one nut element being axially movable with respect to the other in a take-up action, nut actuator means interposed between said thrust collar and said movable nut element and having thrust bearing at one end against said collar and at the opposite end against said nut element, said nut actuator means having a part rotative about the screw and having cam surfaces acting between said rotative part and said axially movable nut element and being movable rotatively by said part to impart axial movement to said nut element, and spherical faces acting between said nut actuator means and said thrust collar for circumferentially equalizing the action of said cam surfaces against said nut element.

4. A back lash compensator as set forth in claim 3, including means for adjusting said thrust collar lengthwise of the screw to obtain said working engagement between the screw and nut elements at the largest portion of the screw thread.

5. A back lash compensator of the character described comprising, in combination, a movable support, driving means for said support comprising a feed screw, a pair of nut elements in close relation to each other threaded thereto one adjacent to the other, means for imparting relative rotational movement to the screw and nut elements to feed the support back and forth, means for maintaining a constant angular relationship between said nut elements and permitting relative axial movement between each nut element and the feed screw, and an individual take-up device acting against the outer end of each nut element for controlling the relative axial position of said nut element to maintain a tight working engagement between said nut element and the feed screw, each said device including a thrust collar about the screw spaced from the outer end of its nut element, nut actuator means interposed between said thrust collar and said movable nut element and having thrust bearing at one end against said collar and at the opposite end against said nut element, said nut actuator means having a part rotative about the screw and having helical means acting against said nut element to impart axial movement to said nut element upon rotative movement of said actuator part, and spherical faces acting between said sleeve member and said thrust collar for circumferentially equalizing the action of said helical means against said nut element, said take-up devices acting simultaneously against the respective nut elements to urge each such nut element against an opposite side of the thread on the feed screw.

6. A back lash compensator as set forth in claim 5, including means for adjusting one of said thrust collars axially of the screw.

7. A back lash compensator of the character described comprising, in combination, a movable support, driving means for said support comprising a feed screw, a pair of nut elements threaded thereto, means for imparting relative rotational movements to the screw and nut elements to drive the work support, means for maintaining a constant angular relationship between said nut elements, and a take-up device for controlling the relative axial positions of the nut elements to maintain a tight working engagement between the nut elements and the screw comprising nut actuator means rotative about the screw and having a plurality of circumferentially spaced helical cam surfaces cooperating with one of said nut elements to impart axial movement thereto upon rotative movement of said actuator, a thrust collar about the screw cooperating with said nut actuator means to take the end thrust thereof opposed to axial movement of said nut element, and means operative between said thrust collar and said nut actuator means for equalizing the action of said helical cam surfaces to impart uniform axial thrust against axially movable nut element at said circumferentially spaced cam surfaces.

8. In a back lash compensator of the character described, in combination, a support, means for moving said support including a feed screw and a pair of nut members threaded thereto, driving means for causing rotation between the screw and nut elements to effect said feed movement, means for maintaining constant angular relationship between said nut elements, and a take-up device for controlling the relative axial positions of the nuts to maintain a working engagement between the screw and nut elements free from back lash, said support having a bore shaped to receive and support said nut elements and parts of said take-up device, one of said nut elements having end thrust against a fixed shoulder at one end of said bore the other nut element being movable axially within the bore and with respect to the first mentioned nut element, said take-up device including a thrust collar about the screw, threaded in said bore at the end opposite from said fixed shoulder, nut actuator means interposed between said thrust collar and said axially movable nut element and having thrust bearing at one end against said collar and at the opposite end against said axially movable nut element, said nut actuator means having a part supported in said bore for rotative movement about the screw, and helical means acting between said rotative part of said nut actuator means and said axially movable nut element and movable rotatively by said part to impart axial movement to said nut element.

9. A back lash compensator of the character described comprising, in combination, a movable support, driving means for said support comprising a feed screw, a pair of nuts threaded thereto, means for imparting relative rotational movements to the screw and nut elements to drive the work support, means for maintaining constant angular relationship between said nut elements, and a take-up device for controlling the relative axial positions of the nut elements to maintain a tight working engagement between the nut elements and the screw including a thrust collar about the screw spaced from the end of one of said nut elements, said one nut element being axially movable with respect to the other in a take-up action, nut actuator means interposed between said thrust collar and said movable nut element and having thrust bearing at one end against said collar and at the opposite end against said nut element, said nut actuator means having a part rotative about the screw and having helical means acting between said rotative part and said axially movable nut element and being movable rotatively by said part to impart axial movement to said nut element, and spherical faces acting between said nut actuator means and said thrust collar for circumferentially equalizing the action of said helical means against said nut element.

CHARLES B. DE VLIEG.